(12) United States Patent
Nakano et al.

(10) Patent No.: US 6,934,620 B2
(45) Date of Patent: Aug. 23, 2005

(54) FUEL INJECTION QUANTITY CONTROL DEVICE

(75) Inventors: Futoshi Nakano, Fujisawa (JP); Akira Hirata, Fujisawa (JP); Koichiro Yomogida, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 11 days.

(21) Appl. No.: 10/764,912

(22) Filed: Jan. 26, 2004

(65) Prior Publication Data

US 2004/0158385 A1 Aug. 12, 2004

(30) Foreign Application Priority Data

Jan. 29, 2003 (JP) .................................. 2003-020286

(51) Int. Cl.[7] .............................................. B60K 41/04
(52) U.S. Cl. ........................ 701/104; 123/480; 123/357; 477/111
(58) Field of Search ................................ 701/104, 102, 701/115; 123/352, 357, 478, 480; 477/111

(56) References Cited

U.S. PATENT DOCUMENTS

| | | | |
|---|---|---|---|
| 3,939,738 A | * 2/1976 | Adey et al. ................. | 123/357 |
| 4,766,544 A | * 8/1988 | Kurihara et al. ............. | 701/67 |
| 5,665,026 A | 9/1997 | Linden ....................... | 477/108 |
| 6,135,918 A | 10/2000 | Bellinger et al. ........... | 477/111 |
| 6,338,697 B1 | * 1/2002 | Baudoin et al. ............. | 477/203 |

FOREIGN PATENT DOCUMENTS

| | | | |
|---|---|---|---|
| JP | 02-233854 | 9/1990 | |
| JP | 08-067171 | 3/1996 | |
| JP | 10-250408 | 9/1998 | |
| JP | 10-252520 | 9/1998 | |
| JP | 2002-256945 A | * 9/2002 | .......... F02D/41/38 |

OTHER PUBLICATIONS

Copy of European Search Report for Serial No. EP 04 00 1266 dated May 24, 2004 (Japanese Abstract No. 10 250408 previously submitted in IDS on Jan. 26, 2004).

* cited by examiner

*Primary Examiner*—Hieu T. Vo
(74) *Attorney, Agent, or Firm*—McCormick, Paulding & Huber LLP

(57) ABSTRACT

A fuel injection quantity control device includes: vehicle speed detection unit; gear position detection unit; engine revolution speed detection unit; accelerator opening degree detection unit; target acceleration value computation unit for finding a basic target acceleration value corresponding to the difference between the set limit vehicle speed and an actual vehicle speed and an upper limit value and lower limit value of the basic target acceleration value for each gear position in a map, limiting the basic target acceleration value with the upper limit value and lower limit value, and determining a target acceleration value; basic fuel injection quantity for vehicle speed limit computation unit for determining a basic fuel injection quantity for vehicle speed limit by feedback computation from the difference between the determined target acceleration value and the actual acceleration value; an accelerator required injection quantity computation unit for computing an accelerator required injection quantity from the engine revolution speed and accelerator opening degree; and vehicle speed limit injection quantity computation unit for selecting the smaller of the basic fuel injection quantity for vehicle speed limit and accelerator required injection quantity and setting it as a fuel injection quantity for vehicle speed limit.

12 Claims, 3 Drawing Sheets

FUEL INJECTION QUANTITY CONTROL DEVICE

CROSS REFERENCE TO RELATED APPLICATION

Applicants hereby claim foreign priority benefits under U.S.C. § 119 of Japanese Patent Application No. 2003-20286, filed on Jan. 29, 2003, the content of which is herein incorporated by reference.

BACKGROUND OF THE INVENTION

1. Field of the Invention

The present invention relates to a fuel injection quantity control device for limiting the fuel injection quantity so as to prevent the vehicle speed from exceeding the set limit vehicle speed.

2. Description of the Related Art

The maximum speed of trucks and tractors is sometimes limited due to legal restrictions or in order to reduce the noise or fuel consumption.

Such a vehicle speed limit control is conducted in such a manner that when the vehicle speed approaches the limit speed, the quantity of fuel injected into the engine is limited so that the vehicle speed does not exceed the limit vehicle speed.

More specifically, if the vehicle speed limit control is actuated, the difference between the actual acceleration value and target acceleration value is computed, a proportional term and an integral term are found from this difference, a basic fuel injection quantity for vehicle speed limit is determined by adding up those proportional term and integral term (see, for example, Japanese Patent Application Laid-open No. H10-250408), and the accelerator requested injection quantity is determined from the engine revolution speed and accelerator opening degree.

The basic fuel injection quantity for vehicle speed limit and accelerator requested injection quantity are compared to each other and the smaller of them is selected as the vehicle speed limit injection quantity that will be actually injected into the engine.

With the control device described in Japanese Patent Application Laid-open No. H10-250408, the vehicle speed is prevented from overshooting and exceeding the limit vehicle speed by finding the proportional term and integral term from the difference between the target acceleration value and actual acceleration value, rather than from the difference between the limit vehicle speed and actual vehicle speed, and determining the basic fuel injection quantity for vehicle speed limit from the proportional term and integral term.

However, the problem associated with the control device described in Japanese Patent Application Laid-open No. H10-250408 was that the fuel injection quantity corresponding to a gear position was not taken into account and overshoot could sometimes occur because the vehicle speed changes depending on the gear position, even if the injection quantity is the same.

SUMMARY OF THE INVENTION

The present invention was created to resolve the above-described problems and it is an object of the present invention to provide a fuel injection quantity control device in which the optimum fuel injection quantity is determined according to the gear position at the time of control.

In order to attain the above-described object the present invention provides a fuel injection quantity control device for limiting a fuel injection quantity so as to prevent vehicle speed from exceeding the set limit vehicle speed, this device comprises vehicle speed detection means for detecting the vehicle speed; gear position detection means for detecting a gear position; engine revolution speed detection means for detecting an engine revolution speed; accelerator opening degree detection means for detecting an accelerator opening degree; target acceleration value computation means for deriving a basic target acceleration value corresponding to the difference between the set limit vehicle speed and an actual vehicle speed from a map, finding in a map an upper limit value and lower limit value of the basic target acceleration value for each gear position, limiting the basic target acceleration value with the upper limit value and lower limit value, and determining a target acceleration value; basic fuel injection quantity for vehicle speed limit computation means for determining a basic fuel injection quantity for vehicle speed limit by feedback computation from the difference between the target acceleration value determined with the target acceleration value computation means and the actual acceleration value; an accelerator required injection quantity computation means for computing an accelerator required injection quantity from the engine revolution speed and accelerator opening degree; and vehicle speed limit injection quantity computation means for selecting the smaller of the basic fuel injection quantity for vehicle speed limit and the accelerator required injection quantity and setting it as a fuel injection quantity for vehicle speed limit that will be actually injected into the engine.

With the above-described configuration, the optimum fuel injection quantity is determined for each gear position by deriving the basic target acceleration value corresponding to the difference between the set limit vehicle speed and actual vehicle speed from the map, finding the upper limit value and the lower limit value of the basic target acceleration value for each gear position in the map, limiting the basic target acceleration value with the upper limit value and the lower limit value, and determining a target acceleration value. Therefore, overshoot can be reliably prevented.

DESCRIPTION OF THE PREFERRED EMBODIMENTS

The preferred embodiments of the present invention will be described hereinbelow in greater detail with reference to the appended drawings.

Figure 1:
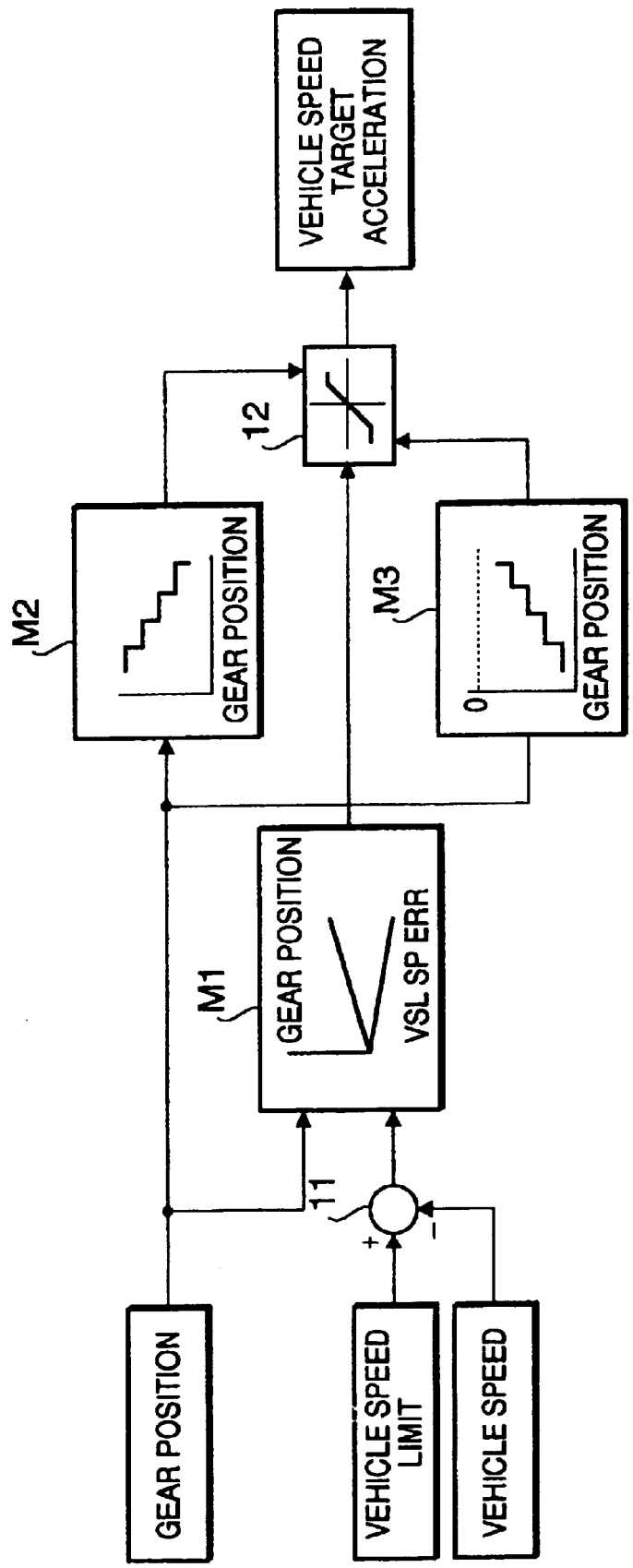
FIG. 1 is a block-diagram illustrating target acceleration value computation means of the preferred embodiment of the fuel injection quantity control device in accordance with the present invention.
Figure 2:
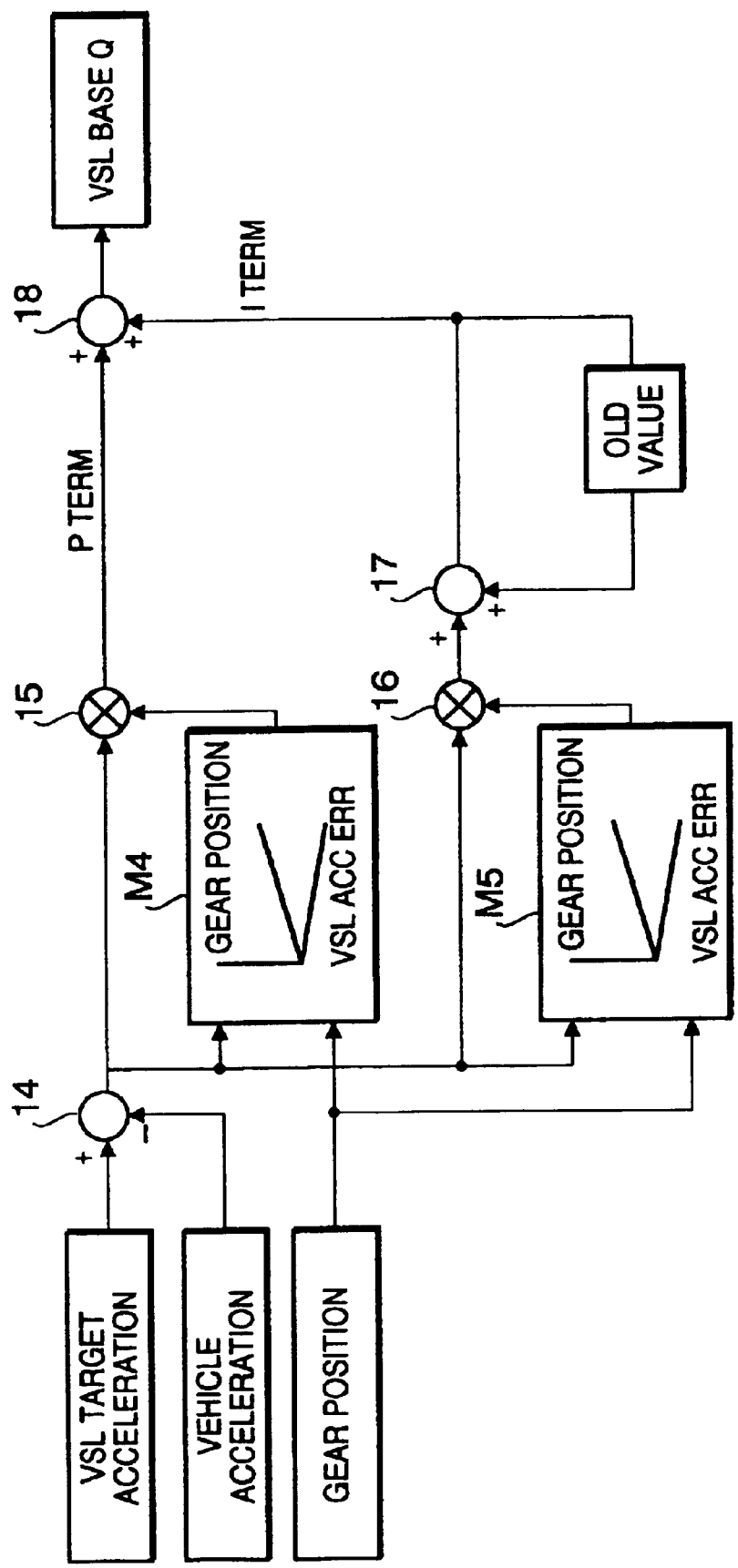
FIG. 2 is a block-diagram illustrating vehicle speed limit base computation means of the preferred embodiment of the fuel injection quantity control device in accordance with the present invention.
Figure 3:
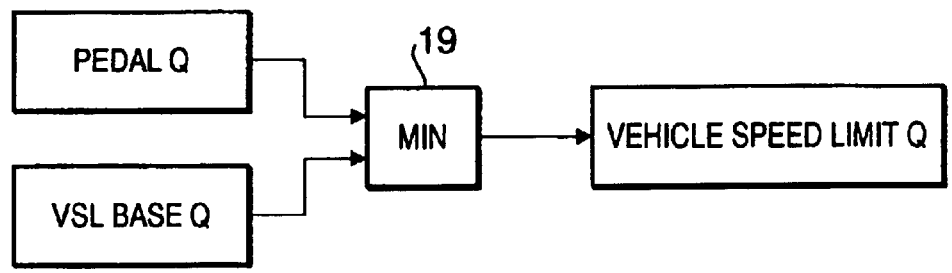
FIG. 3 is a block-diagram illustrating vehicle speed limit computation means of the preferred embodiment of the fuel injection quantity control device in accordance with the present invention.
Figure 4:
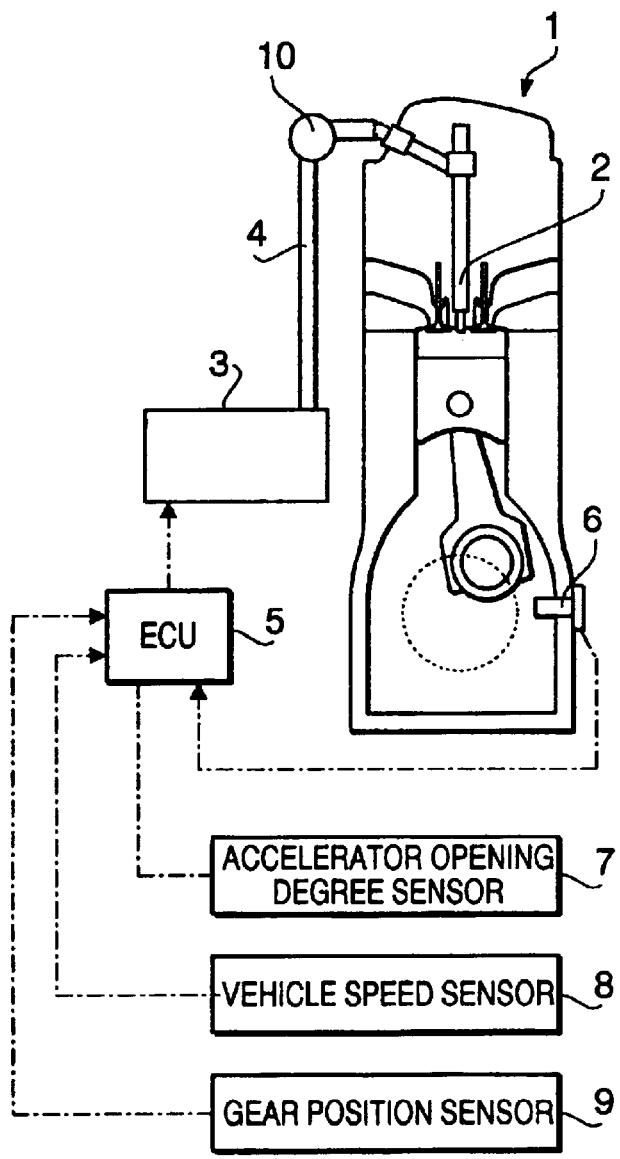
FIG. 4 is a system diagram illustrating the preferred embodiment of the fuel injection quantity control device in accordance with the present invention.

FIG. 1 is a block-diagram illustrating target acceleration value computation means of the preferred embodiment of the fuel injection quantity control device in accordance with the present invention. FIG. 2 is a block-diagram illustrating vehicle speed limit base computation means of the preferred embodiment of the fuel injection quantity control device in accordance with the present invention. FIG. 3 is a block-diagram illustrating vehicle speed limit computation means of the preferred embodiment of the fuel injection quantity control device in accordance with the present invention. FIG. 4 is a system diagram illustrating the preferred embodiment of the fuel injection quantity control device in accordance with the present invention.

In the present embodiment the fuel injection quantity control device of a diesel engine carried on a vehicle with a manual transmission will be considered as an example.

First, the structure of the fuel injection quantity control device in accordance with the present invention will be described.

As shown in FIG. 4, a diesel engine 1 is provided with a fuel injection nozzle 2 for injecting fuel. Fuel is pumped into the fuel injection nozzle 2 from a fuel injection pump 3 via a fuel pipe 4 and a common rail 10. The common rail 10 is connected to the fuel pipe 4 located upstream thereof and to fuel injection nozzles 2 located downstream thereof, thereby branching the fuel from the fuel injection pump 3 into the fuel injection nozzles 2.

The fuel injection pump 3 is herein a distribution-type pump and the fuel pumping quantity thereof is controlled with an electronic control unit (referred to as ECU hereinbelow) 5. Thus, the fuel injection pump 3 is provided with an electromagnetic valve for determining the fuel pumping quantity, and the ECU 5 controls the fuel pumping quantity by appropriately switching this electromagnetic valve.

An engine revolution speed sensor 6 is connected to the ECU 5, and the ECU 5 detects the engine revolution speed based on the output of the sensor. The aforesaid ECU 5 and engine revolution speed sensor 6 constitute engine revolution detection means.

An accelerator opening degree sensor 7 is connected to the ECU 5, and the ECU 5 detects the accelerator opening degree based on the output of the sensor. The aforesaid ECU 5 and accelerator opening degree sensor 7 constitute accelerator opening degree detection means.

A vehicle speed sensor 8 is connected to the ECU 5, and the ECU 5 detects the vehicle speed based on the output of the sensor. The aforesaid ECU 5 and vehicle speed sensor 8 constitute vehicle speed detection means.

A gear position sensor 9 is connected to the ECU 5, and the ECU 5 detects the present gear position based on the output of the sensor. The aforesaid ECU 5 and gear position sensor 9 constitute gear position detection means.

The ECU 5 comprises target acceleration value computation means for deriving the basic target acceleration value corresponding to the difference between the aforesaid set limit vehicle speed and actual vehicle speed and the present gear position from a map, finding in a map the upper limit value and lower limit value of the basic target acceleration value for each gear position, limiting the basic target acceleration with the upper limit value and lower limit value and determining a target acceleration value, basic fuel injection quantity for vehicle speed limit computation means for determining a basic fuel injection quantity for vehicle speed limit by feedback computation from the difference between the target acceleration value determined with the aforesaid target acceleration value computation means and the actual acceleration value, accelerator required injection quantity computation means for computing the accelerator required injection quantity from the engine revolution speed and accelerator opening degree, and vehicle speed limit injection quantity computation means for selecting the smaller of the aforesaid basic fuel injection quantity for vehicle speed limit and accelerator required injection quantity and selecting it as the fuel injection quantity for vehicle speed limit that will be actually injected into the engine.

Target acceleration value computation means, basic fuel injection quantity for vehicle speed limit computation means, and vehicle speed limit injection quantity computation means will be described hereinbelow with reference to FIG. 1, FIG. 2, and FIG. 3, respectively. Calculations or decisions explained hereinbelow are made repeatedly by the ECU 5 for each prescribed interval based on the relationship for digital processing of each value.

As shown in FIG. 1, in target acceleration value computation means, in point 11, a difference (vcl sp err) is computed by subtracting the actual vehicle speed (Vehicle Speed) detected by vehicle speed detection means from a set limit vehicle speed (Vehicle Speed Limit) set in the ECU 5 in advance. This difference and gear position (Gear Position) are then inputted in a map M1.

In map M1, a target acceleration value corresponding to the difference (vcl sp err) and gear position (Gear Position) has been inputted in advance based on the test results, and the target acceleration value is uniquely found by inputting the difference and gear position into the map M1.

In the present embodiment, the target acceleration value is found from the difference (vcl sp err) and gear position (Gear Position) in map M1, but the target acceleration value may be also found only from the difference (vcl sp err).

On the other hand, a map M2 for determining the upper limit value of the target acceleration value corresponding to the gear position and a map M3 for determining the lower limit value are provided in target acceleration value computation means.

In map M2, the upper limit value tends to decrease with an increase in gear position. In map M3, the lower limit value tends to increase with an increase in gear position. In map M3, the lower limit value assumes a negative value and the absolute value thereof decreases and approaches 0 as the gear position increases.

In maps M2 and M3, a gear position (Gear Position) is inputted, the upper limit value and lower limit value are found, and the upper limit value and lower limit value are inputted into a limit unit 12. In the limit unit 12, the basic target acceleration value inputted from the map M1 is compared with the upper limit value and lower limit value and a target acceleration value is determined. More specifically, when the inputted basic target acceleration value is larger than the upper limit value, the upper limit value is outputted as a target acceleration value (Vehicle Speed Target Acceleration), and when the inputted basic target acceleration value is less than the lower limit value, the lower limit value is outputted as a target acceleration value (Vehicle Speed Target Acceleration). Furthermore, when the inputted basic target acceleration value is between the lower limit value and upper limit value, this target acceleration value is outputted as is.

Further, the target acceleration value (Vehicle Speed Target Acceleration) found by this target acceleration value computation means is transmitted to basic fuel injection quantity for vehicle speed limit computation means of the next stage.

As shown in FIG. 2, in basic fuel injection quantity for vehicle speed limit computation means, in point 14, the difference (vsl acc err) is computed by subtracting the actual acceleration value (Vehicle Acceleration) found from the change in the vehicle speed from the target acceleration value (VSL Target Acceleration) found by target acceleration value computation means. The difference (vsl acc err) and gear position (Gear Position) are then inputted in map M4 and map M5, respectively.

In a map M4 in a proportional term, a coefficient for the proportional term corresponding to the difference (vsl acc err) and gear position (Gear Position) has been inputted in advance based on the test results, and the coefficient which is to be multiplied by the difference is uniquely found by inputting the difference and gear position into the map M4.

In a map M5 in an integral term, a coefficient for the integral term corresponding to the difference (vsl acc err) and gear position (Gear Position) has been inputted in advance based on the test results, and the coefficient which is to be multiplied by the difference is uniquely found by inputting the difference and gear position into the map M5.

In those maps M4 and M5, the coefficients that are found usually assume small values if the gear position increases, and the coefficients that are found tend to assume small values if the difference is small.

In point 15, the difference is multiplied by the coefficient for the proportional term found with the map M4, producing a proportional term (P term).

In point 16, the difference is multiplied by the coefficient for the integral term found with the map M5, and in point 17 a preceding value (OLD VALUE) is added to the value obtained, thereby producing an integral term (I term).

Further, in point 18, the aforesaid proportional term and integral term are added up, producing a basic fuel injection quantity for vehicle speed limit (VSL Base Q).

This basic fuel injection quantity for vehicle speed limit (VSL Base Q) found with basic fuel injection quantity for vehicle speed limit computation means is transmitted to vehicle speed limit injection quantity computation means of the next stage.

As shown in FIG. 3, in vehicle speed limit injection quantity computation means, the basic fuel injection quantity for vehicle speed limit (VSL Base Q) found with basic fuel injection quantity for vehicle speed limit computation means and the accelerator required injection quantity (Pedal Q) are inputted in a comparator 19. In the comparator 19, the smaller of them is selected as a vehicle speed limit injection quantity (Vehicle Speed Limit Q).

Further, accelerator required injection quantity computation means computes the accelerator required injection quantity by inputting the engine revolution speed detected by engine revolution speed detection means and the accelerator opening degree detected by accelerator opening degree detection means into a map (not shown in the figures).

In this map, the accelerator required injection quantity usually tends to decrease with the increase in the engine revolution speed and to increase with the increase in the accelerator opening degree.

This vehicle speed limit injection quantity found with vehicle speed limit injection quantity computation means serves as the fuel injection quantity that will be actually injected into the engine.

In target acceleration value computation means of the present embodiment, the optimum fuel injection quantity is determined for each gear position by deriving the basic target acceleration value corresponding to the difference (vsl sp err) between the set limit vehicle speed (Vehicle Speed Limit) and actual vehicle speed (Vehicle Speed), and the present gear position (Gear Position) from the map M1, finding the upper limit value and the lower limit value of the basic target acceleration value for each gear position in the maps M2 and M3, limiting the aforesaid basic target acceleration value with the upper limit value and the lower limit value, and determining a target acceleration value (VSL Target Acceleration). Therefore, since the optimum fuel injection is determined in response to each gear position, overshoot can be reliably prevented for any gear position.

As described hereinabove, in accordance with the present invention, the optimum fuel injection quantity is determined according to the gear position during vehicle speed limit control. Therefore, the present invention demonstrates an excellent effect of reliably preventing the overshoot.

What is claimed is:

1. A fuel injection quantity control device for limiting a fuel injection quantity so as to prevent vehicle speed from exceeding a set limit vehicle speed, this device comprising:

vehicle speed detection means for detecting the vehicle speed;

gear position detection means for detecting a gear position;

engine revolution speed detection means for detecting an engine revolution speed;

accelerator opening degree detection means for detecting an accelerator opening degree;

target acceleration value computation means for deriving a basic target acceleration value corresponding to the difference between the set limit vehicle speed and an actual vehicle speed from a map, finding in a map an upper limit value and lower limit value of the basic target acceleration value for each gear position, limiting the basic target acceleration value with the upper limit value and lower limit value, and determining a target acceleration value;

basic fuel injection quantity for vehicle speed limit computation means for determining a basic fuel injection quantity for vehicle speed limit by feedback computation from the difference between the target acceleration value determined with the target acceleration value computation means and the actual acceleration value;

accelerator required injection quantity computation means for computing an accelerator required injection quantity from the engine revolution speed and accelerator opening degree; and vehicle speed limit injection quantity computation means for selecting the smaller of the basic fuel injection quantity for the vehicle speed limit and the accelerator required injection quantity and setting it as a fuel injection quantity for vehicle speed limit that will be actually injected into the engine.

2. The fuel injection quantity control device according to claim 1, wherein the target acceleration value computation means derives the basic target acceleration from the map in which a gear position also serves as a parameter in addition to the difference between the set limit vehicle speed and actual vehicle speed.

3. The fuel injection quantity control device according to claim 2, wherein the basic fuel injection quantity for vehicle speed limit computation means finds a proportional term and an integral term corresponding to the difference between the target acceleration value and actual acceleration value and the gear position and obtains the basic fuel injection quantity for vehicle speed limit by adding up the proportional term and integral term.

4. The fuel injection quantity control device according to claim 3, wherein the basic fuel injection quantity for vehicle speed limit computation means finds from the map a coefficient for a proportional term corresponding to the difference between the target acceleration value and actual acceleration value and the gear position and obtains the proportional term by multiplying this coefficient for a proportional term by the difference.

5. The fuel injection quantity control device according to claim 4, wherein the basic fuel injection quantity for vehicle speed limit computation means finds from the map a coefficient for an integral term corresponding to the difference between the target acceleration value and actual acceleration value and the gear position and obtains the integral term by multiplying this coefficient for the integral term by the difference and adding up an old value to the obtained value.

6. The fuel injection quantity control device according to claim 3, wherein the basic fuel injection quantity for vehicle speed limit computation means finds from the map a coefficient for an integral term corresponding to the difference between the target acceleration value and actual acceleration value and the gear position and obtains the integral term by multiplying this coefficient for the integral term by the difference and adding up an old value to the obtained value.

7. The fuel injection quantity control device according to claim 2, wherein the accelerator required injection quantity computation means computes the accelerator required injection quantity by inputting the engine revolution speed and the accelerator opening degree into the map.

8. The fuel injection quantity control device according to claim 1, wherein the basic fuel injection quantity for vehicle speed limit computation means finds a proportional term and an integral term corresponding to the difference between the target acceleration value and actual acceleration value and the gear position and obtains the basic fuel injection quantity for vehicle speed limit by adding up the proportional term and integral term.

9. The fuel injection quantity control device according to claim 8, wherein the basic fuel injection quantity for vehicle speed limit computation means finds from the map a coefficient for a proportional term corresponding to the difference between the target acceleration value and actual acceleration value and the gear position and obtains the proportional term by multiplying this coefficient for the proportional term by the difference.

10. The fuel injection quantity control device according to claim 9, wherein the basic fuel injection quantity for vehicle speed limit computation means finds from the map a coefficient for an integral term corresponding to the difference between the target acceleration value and actual acceleration value and the gear position and obtains the integral term by multiplying this coefficient for the integral term by the difference and adding up an old value to the obtained value.

11. The fuel injection quantity control device according to claim 8, wherein the basic fuel injection quantity for vehicle speed limit computation means finds from the map a coefficient for an integral term corresponding to the difference between the target acceleration value and actual acceleration value and the gear position and obtains the integral term by multiplying this coefficient for the integral term by the difference and adding up an old value to the obtained value.

12. The fuel injection quantity control device according to claim 1, wherein the accelerator required injection quantity computation means computes the accelerator required injection quantity by inputting the engine revolution speed and the accelerator opening degree into the map.

* * * * *